(12) United States Patent
Singh et al.

(10) Patent No.: US 11,553,524 B2
(45) Date of Patent: Jan. 10, 2023

(54) METHODS, SYSTEMS, AND COMPUTER READABLE MEDIA FOR RESOURCE OBJECT LEVEL AUTHORIZATION AT A NETWORK FUNCTION (NF)

(71) Applicant: Oracle International Corporation, Redwood Shores, CA (US)

(72) Inventors: Virendra Singh, Bangalore (IN); Jay Rajput, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/192,800

(22) Filed: Mar. 4, 2021

(65) Prior Publication Data
US 2022/0287089 A1    Sep. 8, 2022

(51) Int. Cl.
*H04W 74/08*    (2009.01)
*H04W 12/08*    (2021.01)
(Continued)

(52) U.S. Cl.
CPC ......... *H04W 74/0816* (2013.01); *H04W 4/50* (2018.02); *H04W 12/08* (2013.01); *H04W 72/048* (2013.01)

(58) Field of Classification Search
CPC ..... H04L 9/3247; H04L 67/28; G06F 16/282; G06F 21/60; H04W 72/042; H04W 12/08
(Continued)

(56) References Cited

U.S. PATENT DOCUMENTS 8,619,688 B2 * 12/2013 Ramakrishna ...... H04W 72/042
                                                    370/341
10,104,123 B2 * 10/2018 Ganda .................. G06F 21/629
(Continued)

FOREIGN PATENT DOCUMENTS

EP    3 570 515 A1    11/2019
EP    3188069 B1 *   3/2020    ............. G06F 21/60
(Continued)

OTHER PUBLICATIONS

S. W. Oh and H. S. Kim, "Study on access permission control for the Web of Things," 2015 17th International Conference on Advanced Communication Technology (ICACT), Aug. 2015, pp. 574-580, doi: 10.1109/ICACT.2015.7224926. (Year: 2015).*
(Continued)

*Primary Examiner* — William D Cumming
(74) *Attorney, Agent, or Firm* — Jenkins, Wilson, Taylor & Hunt, P.A.

(57) ABSTRACT

A method for resource object level authorization at a network function (NF) includes maintaining, by a first NF, a service based interface (SBI) resource object access authorization policy database containing policies for controlling access to SBI resource objects and dynamically populating a resource object owner database containing records for resource objects and corresponding resource object owners. The method further includes receiving, by the first NF and from a second NF, a first SBI resource object access request for accessing a resource object, accessing, using information from the first SBI resource object access request, the resource object access authorization policy database and the resource object owner database, determining that an access to the resource object requested by the first resource object access request is not permitted, and preventing the access to
(Continued)

the resource object requested by the first resource object access request.

17 Claims, 12 Drawing Sheets

(51) Int. Cl.
    *H04W 72/04* (2009.01)
    *H04W 4/50* (2018.01)

(58) Field of Classification Search
    USPC .................................................. 370/329, 341
    See application file for complete search history.

(56) References Cited

U.S. PATENT DOCUMENTS

| | | | |
|---|---|---|---|
| 2010/0272036 A1* | 10/2010 | Ramakrishna | H04L 5/0039 370/329 |
| 2017/0085591 A1* | 3/2017 | Ganda | H04W 12/08 |
| 2018/0089249 A1* | 3/2018 | Collins | G06F 16/282 |
| 2019/0253894 A1* | 8/2019 | Bykampadi | H04L 9/3247 |
| 2021/0168215 A1* | 6/2021 | Zong | H04L 67/28 |
| 2021/0288973 A1* | 9/2021 | Dimble | H04L 9/0872 |
| 2022/0159464 A1 | 5/2022 | Rajput | |
| 2022/0182835 A1 | 6/2022 | Rajput | |

FOREIGN PATENT DOCUMENTS

| | | | |
|---|---|---|---|
| KR | 20110108416 A | * | 12/2011 |
| WO | WO 2022/098405 A1 | | 5/2022 |
| WO | WO 2022/125212 A1 | | 6/2022 |

OTHER PUBLICATIONS

J. Wang and Z. Wu, "A New Model for Continuous Network Access Control of Trusted Network Connection," 2009 5th International Conference on Wireless Communications, Networking and Mobile Computing, 2009, pp. 1-5, doi: 10.1109/WICOM.2009.5301865. (Year: 2009).*

Commonly-Assigned, Co-pending U.S. Appl. No. 17/134,635 for "Methods, Systems, and Computer Readable Media for Utilizing Network Function Identifiers to Implement Ingress Message Rate Limiting," (Unpublished, filed Dec. 28, 2020).

Commonly-Assigned, Co-pending U.S. Appl. No. 17/115,746 for "Methods, Systems, and Computer Readable Media for Automatic Key Management of Network Function (NF) Repository Function (NRF) Access Token Public Keys for 5G Core (5GC) Authorization to Mitigate Security Attacks," (Unpublished, filed Dec. 8, 2020).

"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Services and System Aspects; Security architecture and procedures for 5G system (Release 16)," 3GPP TS 33.501, V16.3.0, pp. 1-248 (Jul. 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-209 (Jul. 2020).

Jones et al., "The OAuth 2.0 Authorization Framework: Bearer Token Usage," RFC 6750, pp. 1-18 (Oct. 2012).

Dierks et al., "The Transport Layer Security (TLS) Protocol Version 1.2," RFC 5246, pp. 1-104 (Aug. 2008).

Housley et al., "Internet X.509 Public Key Infrastructure Certificate and Certificate Revocation List (CRL) Profile," RFC 3280, pp. 1-129 (Apr. 2002).

"3rd Generation Partnership Project; Technical Specification Group Core Network and Terminals; 5G System; Principles and Guidelines for Services Definition; Stage 3 (Release 17)," 3GPP TS 29.501, V17.0.0, pp. 1-78 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

Hardt, D., "The OAuth 2.0 Authorization Framework," Internet Engineering Task Force (IETF), RFC 6749, pp. 1-76 (Oct. 2012).

Jones, M. et al., "JSON Web Signature (JWS)", Internet Engineering Task Force (IETF), RFC 7515, pp. 1-59 (May 2015).

Jones, M. et al., "JSON Web Token (JWT)", Internet Engineering Task Force (IETF), RFC 7519, pp. 1-30 (May 2015).

Ericsson, "Cleanup, including removal of Editor's Notes," 3GPP TSG-SA3 Meeting #100e, pp. 1-48 (Aug. 17-28, 2020).

Notification of Transmittal of the International Search Report and the Written Opinion of the International Searching Authority, or the Declaration for International Application No. PCT/US2022/013268 (dated Apr. 7, 2022).

Notification of Transmittal of the International Search Report and the Written Opinion of the International Searching Authority, or the Declaration for International Application No. PCT/US2021/057158 (dated Jan. 27, 2022).

Notification of Transmittal of the International Search Report and the Written Opinion of the International Searching Authority, or the Declaration for International Application No. PCT/US2022/0138268 (dated Apr. 7, 2022).

"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-104 (Jul. 2020).

"3rd Generation Partnership Project; Technical Specification Group Core Network and Terminals; 5G System; Technical Realization of Service Based Architecture; Stage 3 (Release 17)," 3GPP TS 29.500, V17.0.0, pp. 1-82 (Sep. 2020).

Notification of Transmittal of the International Search Report and the Written Opinion of the International Searching Authority, or the Declaration for International Application No. PCT/US2021/042662 (dated Oct. 26, 2021).

* cited by examiner

METHODS, SYSTEMS, AND COMPUTER READABLE MEDIA FOR RESOURCE OBJECT LEVEL AUTHORIZATION AT A NETWORK FUNCTION (NF)

TECHNICAL FIELD

The subject matter described herein relates to network security. More particularly, the subject matter described herein relates to methods, systems, and computer readable media for resource object level authorization at a network function.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that authorization is defined at the network function level, but not at the service based interface (SBI) resource object level, where a resource object is a data structure created at a producer NF at the request of a consumer NF to access a service provided by the producer NF. For example, 3rd Generation Partnership Project (3GPP) Technical Specification (TS) 33.501, clause 13.4 indicates that OAuth 2.0 based authorization is to be used to determine whether a consumer network function can access a service provided by a producer network function. The OAuth 2.0 authorization procedure is defined in Internet Engineering Task Force (IETF) Request for Comments (RFC) 6749. Using the OAuth 2.0 authorization procedure, a consumer network function seeking to access a service presents an access token to the producer NF. The access token is signed by the requesting consumer NF using the public key of the NRF. The producer NF verifies the assess token and grants the consumer NF access to the requested service. Once the consumer NF is granted access to the service, there is no authorization mechanism defined that prevents a network function from accessing a resource object created by another network function. That is, because the same access token is provided to all consumer NFs seeking to access a service provided by a given producer NF, and no further authorization is performed after the access token is verified, consumer NF #2 can intentionally or unintentionally modify a resource object created by consumer NF #1.

Because there is no defined authorization mechanism at the resource object level, there exists a need for methods, systems, and computer readable media for research object level authorization at an NF.

SUMMARY

A method for resource object level authorization at a network function (NF) includes maintaining, by a first NF, a service based interface (SBI) resource object access authorization policy database containing policies for controlling access to SBI resource objects. The method further includes dynamically populating, by the first NF, a resource object owner database containing records for resource objects and corresponding resource object owners. The method further includes receiving, by the first NF and from a second NF, a first SBI resource object access request for accessing a resource object. The method further includes accessing, by the first NF and using information from the first SBI resource object access request, the resource object access authorization policy database and the resource object owner database and determining that an access to the resource object requested by the first resource object access request is not permitted. The method further includes in response to determining that the access to the resource object requested by the first resource object access request is not permitted, preventing the access to the resource object requested by the first resource object access request.

According to another aspect of the subject matter described herein, the first NF comprises a producer NF.

According to another aspect of the subject matter described herein, the first NF comprises a service proxy communication (SCP).

According to another aspect of the subject matter described herein, maintaining the SBI resource object access authorization policy database includes maintaining policies having attributes that identify SBI resource objects, hypertext transfer protocol (HTTP) methods for accessing the SBI resource objects, and consumer NF authorization scopes for the SBI resource objects.

According to another aspect of the subject matter described herein, dynamically populating the resource object owner database includes receiving, from consumer NFs, SBI resource object creation requests, extracting, from the SBI resource object creation requests, NF instance identifiers of the consumer NFs that originated the SBI resource object creation requests, receiving, from producer NFs, responses to the SBI resource object creation requests confirming successful creation of the resource objects, and, in response to receiving the responses, storing the NF instance identifiers of the consumer NFs and corresponding resource object identifiers in the resource object owner database.

According to another aspect of the subject matter described herein, extracting the NF instance identifiers from the SBI resource object creation requests includes extracting the NF instance identifiers of the consumer NFs from sub claim attributes of access tokens in the SBI resource object creation requests.

According to another aspect of the subject matter described herein, accessing the resource object access authorization policy database includes extracting a resource object identifier from the first SBI resource object access request, performing a lookup in the resource object access authorization policy database using the resource object identifier, and locating a record in the resource object access authorization policy database having a resource object identifier that matches the resource object identifier extracted from the first SBI resource object access request.

According to another aspect of the subject matter described herein, determining that the access requested by the first SBI resource object access request is not permitted includes determining that the access is only permitted to an owner of the resource object and determining that the second NF is not the owner of the resource object.

According to another aspect of the subject matter described herein, determining that the access requested by the first SBI resource object access request is not permitted includes determining that a type of access requested by the first SBI resource object access request is not permitted.

According to another aspect of the subject matter described herein, the method for resource object level authorization includes receiving, at the first NF and from a third NF, a second SBI resource object access request for accessing the resource object, accessing the resource object access authorization policy database and the resource object owner database using information from the second SBI resource object access request and granting the third NF access to the resource object.

According to another aspect of the subject matter described herein, a system for resource object level authorization at a network function is provided. The system includes a first network function (NF) including at least one processor and a memory. The system further includes a service based interface (SBI) resource object access authorization policy database located in the memory for storing policies for controlling access to SBI resource objects. The system further includes a resource object owner database for storing records containing resource object identifiers and corresponding resource object owner identifiers. The system further includes a resource object access authorization manager for dynamically populating the records in the resource object owner database, receiving, from a second NF, a first SBI resource object access request for accessing a resource object, accessing, using information from the first SBI resource request, the resource object access authorization policy database and the resource object owner database, determining that an access to the resource object requested by the first SBI resource object access request is not permitted, and, in response to determining that the access to the resource object requested by the first SBI resource object access request is not permitted, preventing the access to the resource object requested by the first SBI resource object access request.

According to another aspect of the subject matter described herein, the SBI resource object access authorization policy database includes policies having attributes that identify SBI resource objects, hypertext transfer protocol (HTTP) methods for accessing the SBI resource objects, and consumer NF authorization scopes for the SBI resource objects.

According to another aspect of the subject matter described herein, in dynamically populating the resource object owner database, the resource object access authorization manager is configured to receive, from consumer NFs, SBI resource object creation requests, extract, from the SBI resource object creation requests, NF instance identifiers of the consumer NFs that originated the SBI resource object creation requests, receive, from producer NFs, responses to the SBI resource object creation requests confirming successful creation of the resource objects, and, in response to receiving the responses, store the NF instance identifiers of the consumer NFs and corresponding resource object identifiers in the resource object owner database.

According to another aspect of the subject matter described herein, the resource object access authorization manager is configured to extract the NF instance identifiers of the consumer NFs from sub claim attributes of access tokens in the SBI resource object creation requests.

According to another aspect of the subject matter described herein, in accessing the resource object access authorization policy database, the resource object access authorization manager is configured to extract a resource object identifier from the first SBI resource object access request, perform a lookup in the resource object access authorization policy database using the resource object identifier, and locate a record in the resource object access authorization policy database having a resource object identifier that matches the resource object identifier extracted from the first SBI resource object access request.

According to another aspect of the subject matter described herein, in determining that the access requested by the first SBI resource object access request is not permitted, the resource object access authorization manager is configured to determine that the access is only permitted to an owner of the resource object and determining that the second NF is not the owner of the resource object.

According to another aspect of the subject matter described herein, in determining that the access requested by the first SBI resource object access request is not permitted, the resource object access authorization manager is configured to determine that a type of access requested by the first SBI resource object access request is not permitted.

According to another aspect of the subject matter described herein, a non-transitory computer readable medium having stored thereon executable instructions that when executed by a processor of a computer control the computer to perform steps is provided. The steps include maintaining, by a first network function (NF), a service based interface (SBI) resource object access authorization policy database containing policies for controlling access to SBI resource objects. The steps further include dynamically populating, by the first NF, a resource object owner database containing records for resource objects and corresponding resource object owners. The steps further include receiving, by the first NF and from a second NF, a first SBI resource object access request for accessing a resource object. The steps further include accessing, by the first NF and using information from the first SBI resource object access request, the resource object access authorization policy database and the resource object owner database and determining that an access to the resource object requested by the first SBI resource object access request is not permitted. The steps further include, in response to determining that the access to the resource object requested by the first SBI resource object access request is not permitted, preventing the access to the resource object requested by the first SBI resource object access request.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
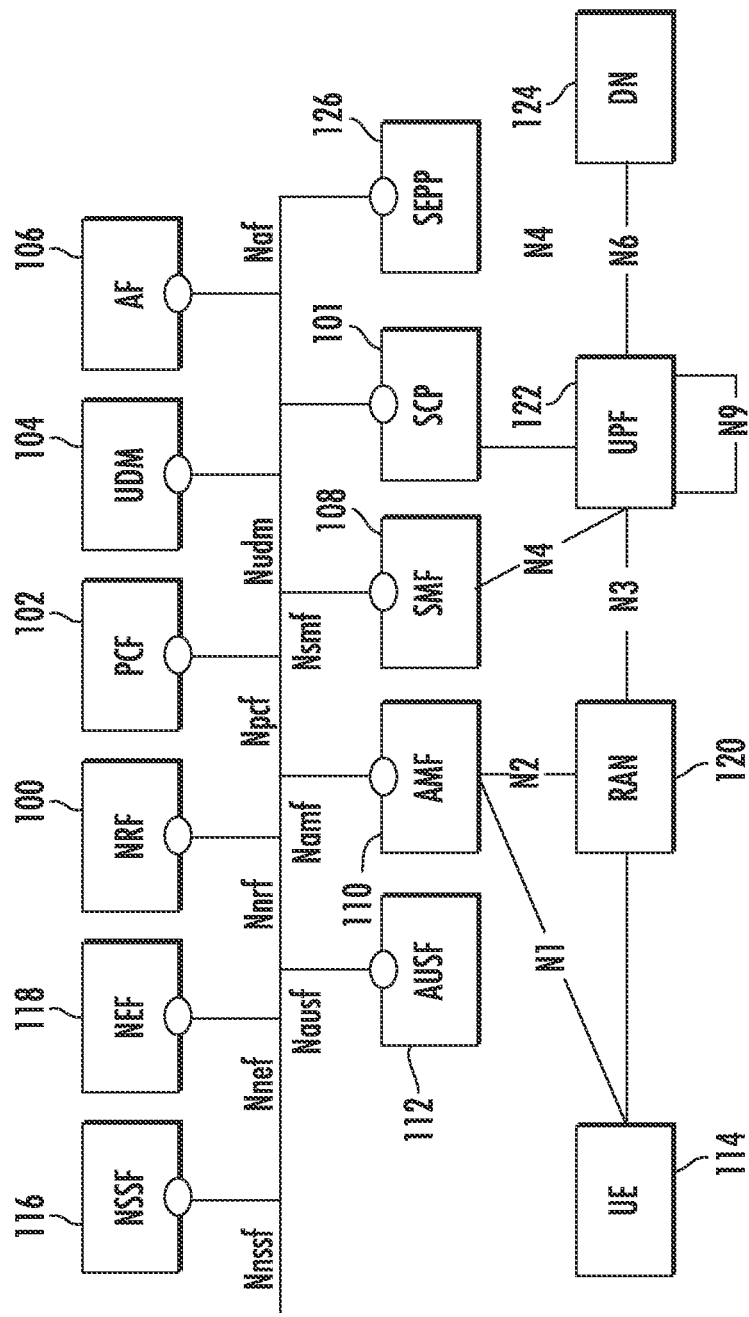
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As described above, one problem with the 3GPP network architecture for 5G networks is that while 3GPP TS 33.501 specifies that the OAuth 2.0 authorization procedure should be used for NF service producers to authorize requests from NF service requestors, different produce NFs can access a resource using the same OAuth 2.0 access token, which can result in data disclosure to unauthorized 5G NFs, data loss, denial of service, or data manipulation. The subject matter described herein provides a method to secure 5G SBI API resource objects from unauthorized access by 5G consumer NFs. Examples of unauthorized access include read, delete, and update access. In one example, the 5G SBI API resource object level authorization is implemented at a service communication proxy or SCP. In another implementation, the 5G SBI API resource object level authorization is implemented at a producer NF.

Figure 2A:
FIG. 2A is a message flow diagram illustrating exemplary messages exchanged for creating a resource object at an NF service producer using the HTTP POST method.

An SBI resource object is a data structure created at an NF service producer using the SBI interface that allows an NF service consumer to access service provided by the NF service producer. FIG. 2A illustrates an example of creating an SBI resource object using the HTTP POST method. Referring to FIG. 2A, in line 1 of the message flow diagram, an NF service consumer 200 sends an HTTP POST message to an NF service producer 202 to create a new resource object at the NF service producer 202. The HTTP POST message identifies a child resource using a uniform resource indicator (URI). In response to the HTTP POST message, NF service producer 202 creates the requested resource object and, in line 2, sends a 201 Created message to NF service consumer 200 indicating that the requested resource object has been created. It should be noted that there is no authorization for access to the newly created resource object, meaning that an NF service consumer other than NF service consumer 200 can access the newly created resource object.

Figure 2B:
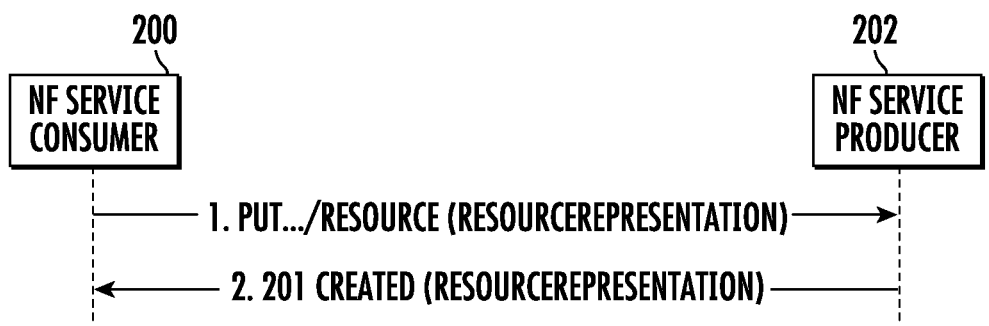
FIG. 2B is a message flow diagram illustrating exemplary messages exchanged for creating a resource object at an NF service producer using the HTTP PUT method.

In another example, a resource object can be created at an NF service producer using the HTTP PUT method. This method is illustrated in FIG. 2B. In line 1 of the message flow in FIG. 2B, NF service consumer 200 sends an HTTP PUT message to NF service producer 202. The PUT message specifies a resource object that NF service consumer 200 wishes to create at NF service producer 202. In response to the HTTP PUT message, NF service producer 202 creates the requested resource object and sends a 201 Created message in line 2 to NF service consumer 200. Like the resource object created using the POST method, the resource object created using the PUT method can also be accessed without authorization at the resource object level by any consumer NF that obtains an access token from the NRF.

Figure 3A:
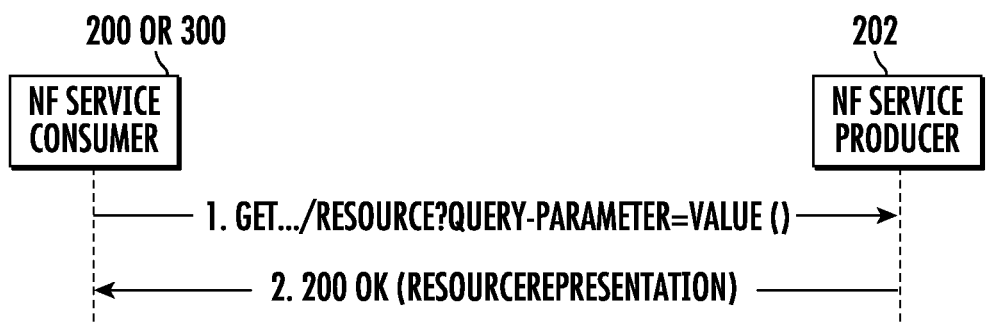
FIG. 3A is a message flow diagram illustrating exemplary messages exchanged for reading a single resource object using the HTTP GET method.

One method by which consumer NFs can access an SBI resource object is using the HTTP GET method. FIG. 3A illustrates an example of accessing an SBI resource object using the HTTP GET method. As described above, an existing resource object can be accessed by a consumer NF that created the resource object or by a consumer NF that did not create the resource object. In FIG. 3A and the remaining figures, NF service consumer 200 is assumed to be the resource object creator, and NF service consumer 300 is assumed to be a consumer NF other than the resource object creator that is seeking to access the resource object. Referring to FIG. 3A, in line 1, an NF service consumer 200 or 300 sends an HTTP GET message to NF service producer 202 identifying and SBI resource object. In FIG. 3A the resource object is a single resource identified by a URI and possibly other query parameters. NF service producer 202 responds to the HTTP GET message in line 2 by sending a 200 OK message with the requested representation of the resource object. It should be noted that other than requiring a valid network access token, there is no authorization performed by NF service producer 202 before providing the resource object representation. Thus an authorized consumer NF, such as consumer NF 200 that created the resource object, can access the resource object, and an unauthorized consumer NF, such as consumer NF 300, can access the resource object because there is no authorization procedure defined at the resource object level.

Figure 3B:
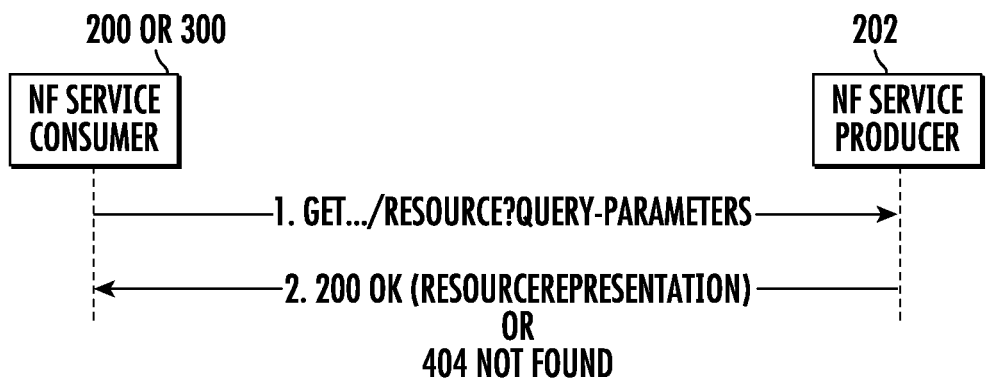
FIG. 3B is a message flow diagram illustrating exemplary messages exchanged for querying a set of resource objects using the HTTP GET method.

In another example, an NF service consumer 200 or 300 may utilize the HTTP GET method to access a set of resources. This example is illustrated in FIG. 3B. In line 1 of the message flow in FIG. 3B, NF service consumer 200 or 300 sends an HTTP GET message to NF service producer 202. The HTTP GET message specifies query parameters identifying a set of resources. The query component contains non-hierarchical data that along with data in the path component is used by NF service producer 202 to filter the resources identified within the scope of the URI's scheme to a subset of resources matching the query parameters. The query component is indicated by the first "?" character and terminated by "#" character at the end of the URI. Like the access to a single resource, the access to multiple resources can be provided to unauthorized consumer NFs.

Figure 4A:
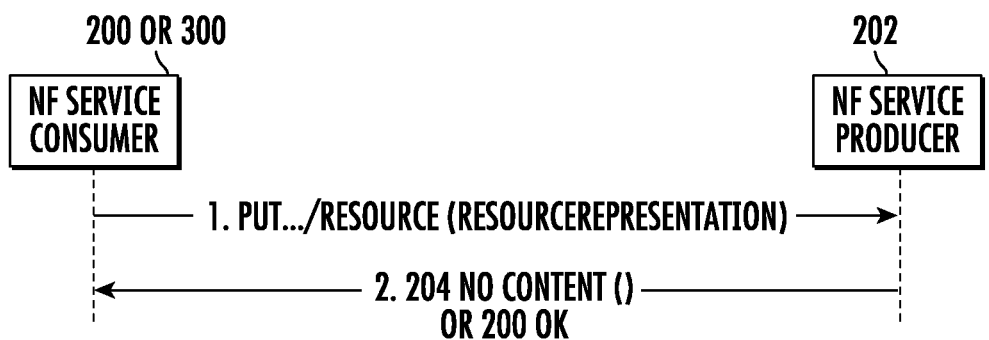
FIG. 4A is a message flow diagram illustrating exemplary message exchanged for updating a resource object using the HTTP PUT method.

Another type of resource object access is access to update a resource object. FIG. 4A is a message flow diagram illustrating the use of the HTTP PUT method to update a resource object. The HTTP PUT method allows a service consumer NF to update information stored at a producer NF by means of a complete replacement. The PUT method replaces the current representation of a resource object with a new representation. Referring to the message flow illustrated in FIG. 4, in line 1, NF service consumer 200 or 300 sends and HTTP PUT message to NF service producer 202. The PUT message includes an identifier for the resource object and the resource object representation that represents the resource object being replaced. In line 2 of the message flow diagram, NF service producer 202 replaces the resource object with the new resource representation and responds with a 200 OK message if the replacement was successful or a 204 No Content message if the replacement operation is not successful. There is no authorization at the resource object level prior to performing the resource object replacement.

Figure 4B:
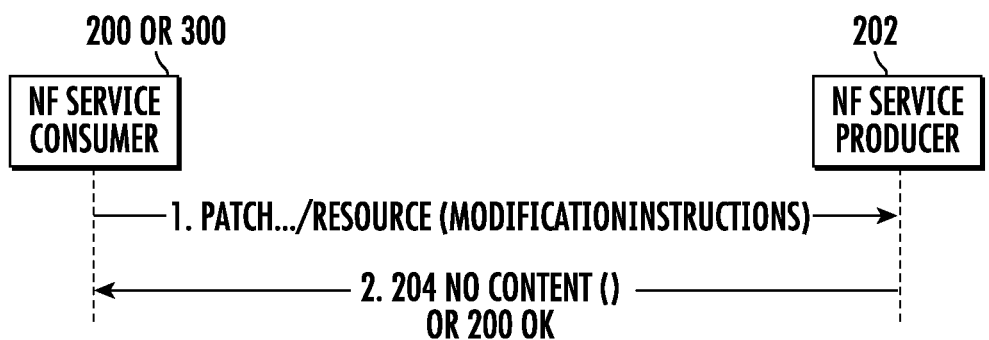
FIG. 4B is a message flow diagram illustrating exemplary messages exchanged for updating a resource object using the HTTP PATCH method.

FIG. 4B is a message flow diagram illustrating the use of the HTTP PATCH method to update an existing resource object. The HTTP PATCH method allows a consumer NF to update information stored at a producer NF by means of a partial replacement. The PATCH method modifies the current representation of a resource object according to modification instructions provided in the PATCH method. Referring to the message flow in FIG. 4B, in line 1, NF service consumer 200 or 300 sends an HTTP PATCH message to NF service producer 202. The HTTP PATCH message identifies the resource object being modified and includes modification instructions. In line 2 of the message flow diagram, NF service producer 202 replaces or modifies the resource object if the resource object is present at NF service producer 202 or sends a 204 No Content message if the resource object is not present. Again, there is no authorization at the resource object level. A legitimate consumer, such as consumer NF 200 that created the resource or another consumer NF 300 that did not create the resource, can modify the resource object by presenting a valid access token obtained from the NRF.

Figure 5:
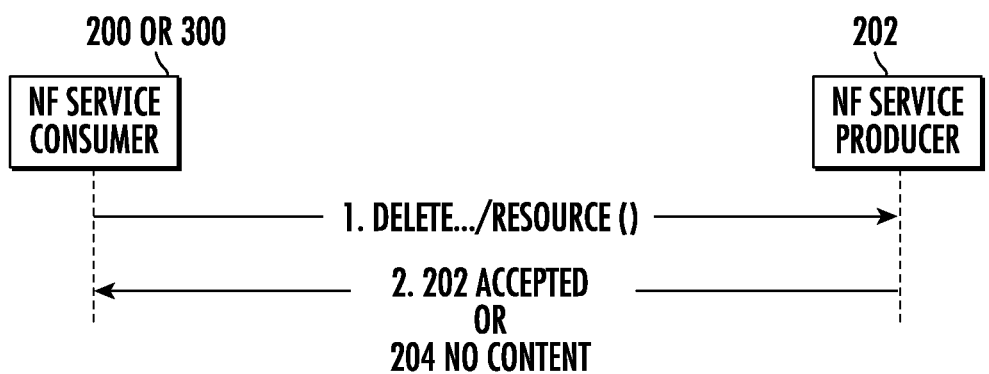
FIG. 5 is a message flow diagram illustrating exemplary messages exchanged for deleting a resource object using the HTTP DELETE method.

Yet another type of access to a resource object is delete access. FIG. 5 is a message flow diagram illustrating the use of the HTTP DELETE method to delete a resource object. The HTTP DELETE method enables an NF service consumer to delete an entire resource object at an NF service producer. Referring to the message flow in FIG. 5, in line 1, NF service consumer 200 or 300 sends an HTTP DELETE message to NF service producer 202. NF service producer 202 determines whether the resource object identified in the DELETE message is present at NF service producer 202 and, if present, deletes the resource object. In line 2, NF service producer 202 responds with a 202 Accepted message if the delete operation was successful or a 204 No Content message if the delete operation was not successful. There is no resource object level authorization performed for the HTTP DELETE method. As long as NF service consumer 200 or 300 has a signed access token for producer NF 202 obtained using the OAuth 2.0 procedure, NF service consumer 200 or 300 can access and delete the resource object.

Figure 6A:
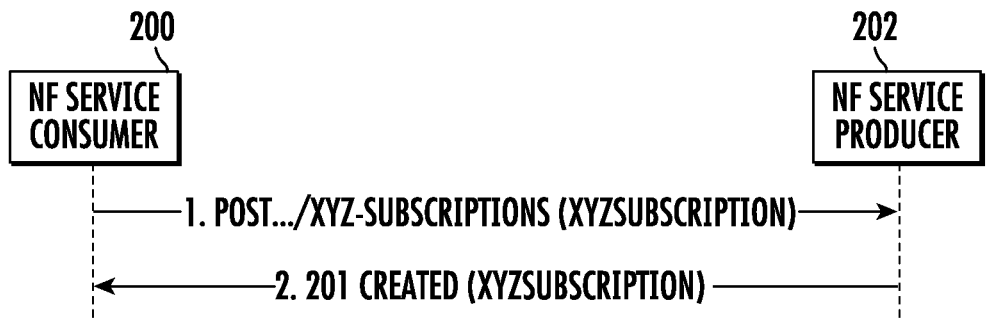
FIG. 6A is a message flow diagram illustrating exemplary messages exchanged for creating a subscription resource object using the HTTP POST method.
Figure 6B:
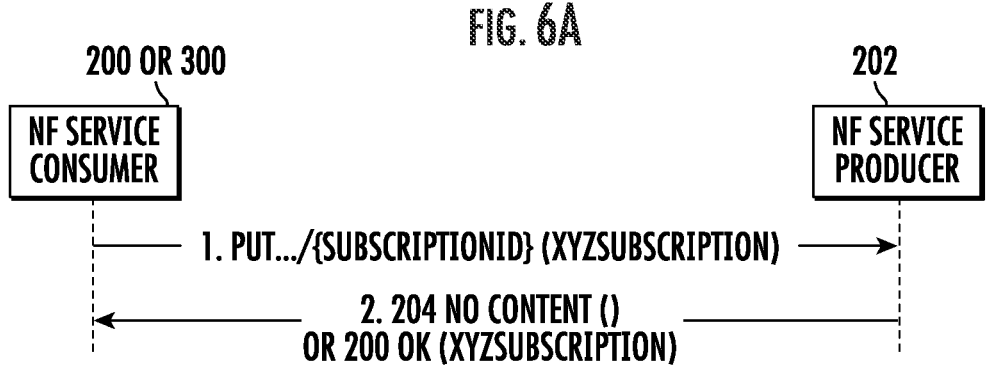
FIG. 6B is a message flow diagram illustrating exemplary messages exchanged for creating a subscription resource object using the HTTP PUT method.

In addition to request/response communications as described above, resource objects can be created, read, and modified using subscribe/notify communications. FIG. 6A is a message flow diagram illustrating an NF service consumer creating a subscription resource object using the HTTP POST method. Referring to FIG. 6A, in line 1, NF service consumer 200 or 300 sends an HTTP POST message to NF service producer 202. The HTTP POST message identifies a subscription resource object being created. In response to the HTTP POST message, in line 2, NF service producer 202 creates the requested subscription resource object and responds to the POST message with a 201 Created message indicating that the subscription resource object has been created. FIG. 6B illustrates the updating of a subscription resource object using the HTTP PUT method. The HTTP PUT method allows an NF service consumer to replace an existing subscription resource object at an NF service producer. Referring to FIG. 6B, in line 1, NF service consumer 200 or 300 sends an HTTP PUT message to NF service producer 202. The HTTP PUT message identifies the subscription resource object created in FIG. 6A. In response to the HTTP PUT method, NF service producer 202 either replaces the subscription resource object with the new representation of the subscription resource object specified in the PUT message or responds with a 204 No Content message if the PUT operation was not successful. There is no resource object level authorization required to perform a PUT operation for an existing subscription.

Figure 6C:
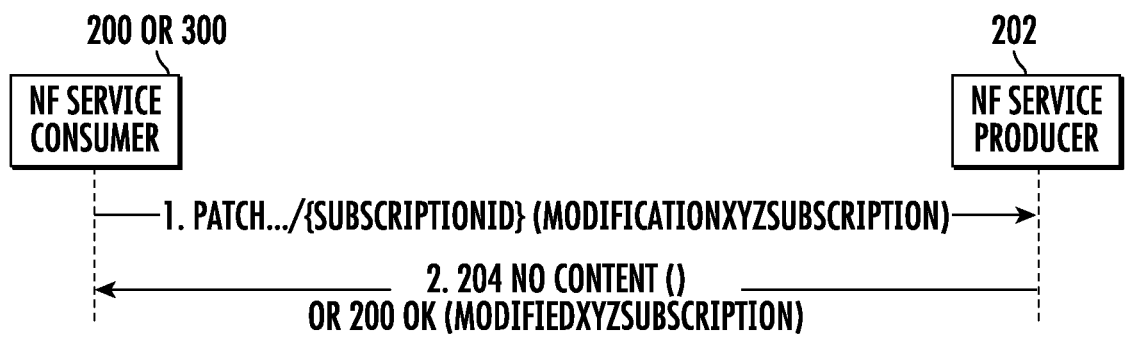
FIG. 6C is a message flow diagram illustrating exemplary messages exchanged for updating of a subscription resource object using the HTTP PATCH method.

FIG. 6C illustrates the use of the HTTP PATCH method to modify a subscription. Referring to FIG. 6C, in line 1 of the message flow diagram, NF service consumer 200 or 300 sends an HTTP PATCH message with an identifier for a subscription resource object and instructions to modify the subscription resource object to NF service producer 202. In response to the HTTP PATCH message, NF service producer 202 responds with a 200 OK message if the subscription was successfully modified or a 204 No Content message if the subscription was not successfully modified. There is no authorization at the resource object level.

Figure 6D:
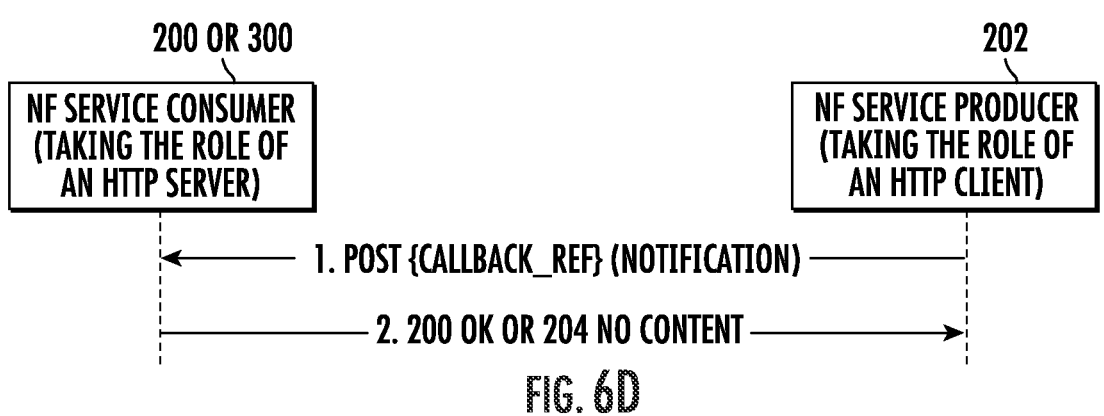
FIG. 6D is a message flow diagram illustrating the exemplary providing of information relating to a subscription resource object using the HTTP POST method.

FIG. 6D illustrates the use of the HTTP POST method to send a notification regarding an existing subscription. Referring to FIG. 6D, in line 1 of the message flow diagram, NF service producer 202 sends an HTTP POST message to NF service consumer 200 or 300 containing a notification triggered by a condition specified in an existing subscription resource object. In line 2, NF service consumer 200 or 300 responds with a 200 OK or 204 No Content message, depending on whether the POST operation was successful. Thus, FIG. 6D illustrates that legitimate service consumers or unauthorized service consumers can obtain information regarding an existing subscription by receiving resource event triggered notifications without resource object level authorization.

Figure 7A:
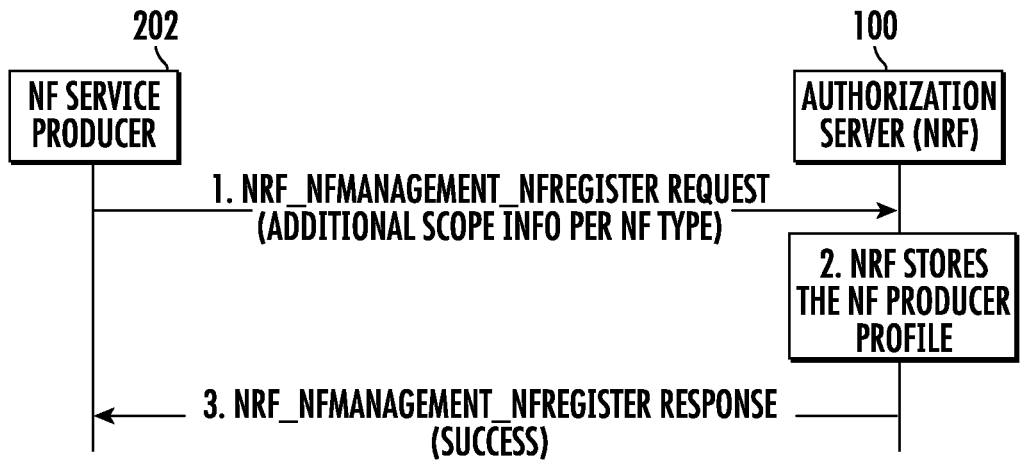
FIG. 7A is a message flow diagram illustrating exemplary messages exchanged for a producer NF to obtain an access token from an NRF.
Figure 7B:
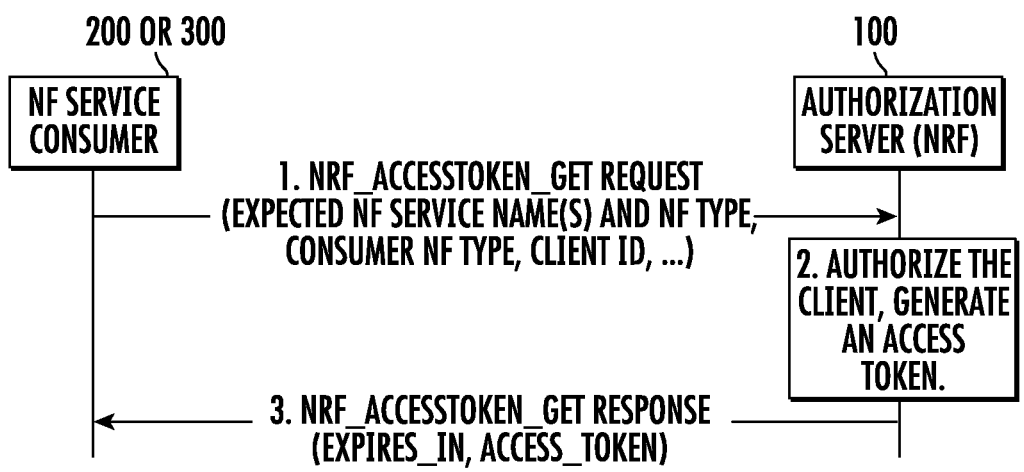
FIG. 7B is a message flow diagram illustrating exemplary messages exchanged for a consumer NF to obtain an access token from and NRF.

FIGS. 7A and 7B illustrate the authorization framework specified in 3GPP TS 33.501. According to clause 13.4.1 of 3GPP TS 33.501, NF service producers authorize requests from NF service request consumers using the OAuth 2.0 framework as specified in IETF RFC 6749. According to clause 4.4 of IETF RFC 6749, grants shall be of the type client credentials grant, which means that a client is granted credentials at the client level. The mechanism for an NF service consumer to access services provided by an NF service producer is a JSON web token described in IETF RFC 7519 secured with a digital signature or a message authentication code based on a JSON web signature as specified in IETF RFC 7515.

FIG. 7A illustrates the procedure for an NF service producer to create a profile with an NRF. Referring to FIG. 7A, in line 1, NF service producer 202 sends an Nnrf_NF-Management_NFRegister request to NRF 100. In step 2, NRF 100 stores the NF profile for the producer NF. In step 3, NRF 100 responds with an Nnrf_NFManagement_N-FRegister response indicating that the NF profile was successfully established.

FIG. 7B illustrates the process of an NF service consumer obtaining an access token from NRF 100. Referring to FIG. 7B, in line 1, NF service consumer 200 or 300 sends an NRF access token GET request to NRF 100 identifying the service for which access is requested. In line 2, NRF 100 authorizes the client (NF service consumer 200 or 300) and generates an access token for accessing the service identified in the NRF access token GET request. In line 3, NRF 100 responds with an NRF access token GET response containing the access token and provides the access token to NF service consumer 200 or 300. The access token allows any service consumer to access resource objects created at producer NF 202, regardless of whether the NF service consumer is the creator of the resource object.

Figure 7C:
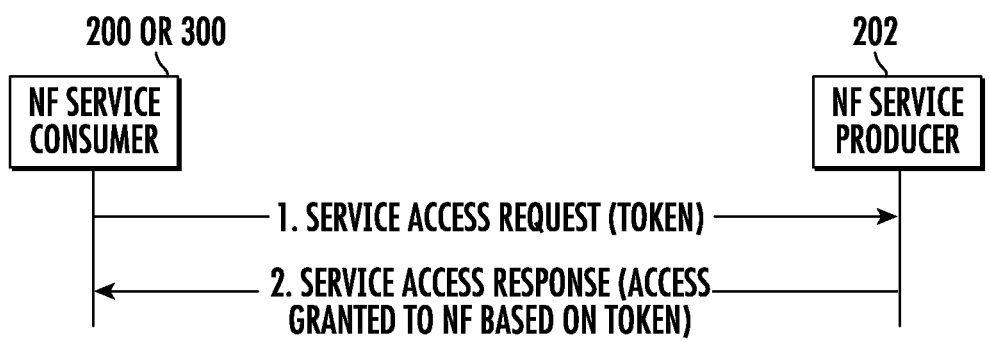
FIG. 7C is a message flow diagram illustrating the use of the access token by NF service consumer to obtain service or access the service provided by an NF service producer.

FIG. 7C illustrates the use of the access token by NF service consumer 200 or 300 to obtain service or access the service provided by NF service producer 202. Referring to FIG. 7C, in line 1, NF service consumer 200 or 300 sends a service request to NF service producer 202. The service request includes the access token. In line 2, NF service producer 202 validates the access token and provides access to the requested service. There is no authorization performed at the resource object level. As long as NF service consumer 200 or 300 presents a valid access token, resource objects can be read, modified, or deleted.

Figure 8:
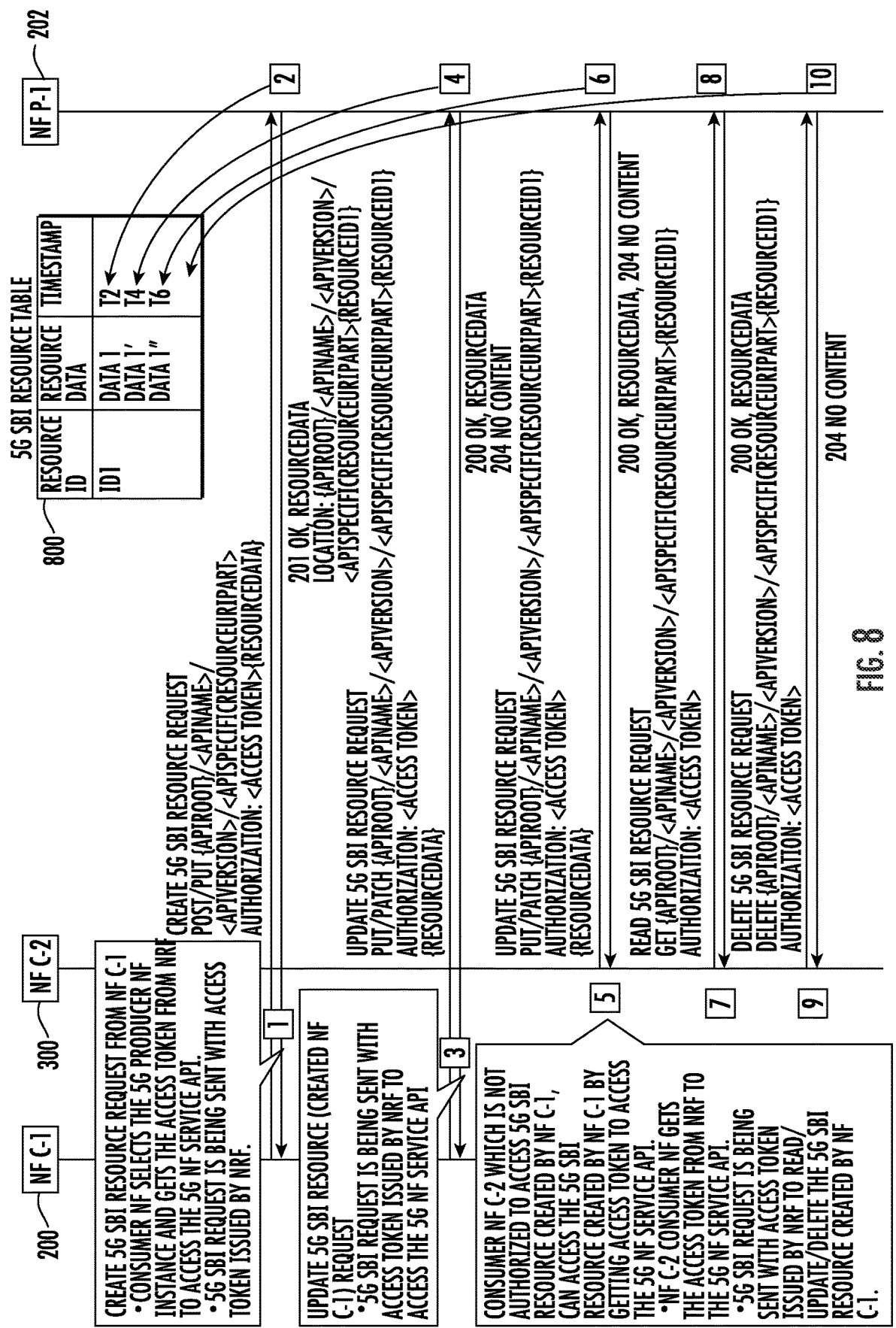
FIG. 8 is a message flow diagram illustrating the unauthorized updating of a resource object using direct SBI communication.

FIG. 8 is a message flow diagram illustrating direct SBI communications where consumer NFs communicate directly with producer NFs to create SBI resource objects and access the resource objects. Referring to FIG. 8, in line 1, consumer NF 200 sends a message to producer NF 202 to create a resource object. Consumer NF 200 is assumed to have previously obtained an access token from the NRF to access services provided by producer NF 202. The access token is included in the create resource request message, which in the illustrated example is in a HTTP PUT or POST message. In line 2, producer NF 202 responds to the create resource request message with a 201 Created message containing the resource data.

In line 3 of the message flow in FIG. 8, consumer NF 200 sends a message to update the resource object with producer NF 202. The update message may be an HTTP PUT or PATCH message and includes the access token obtained from the NRF. In line 4, producer NF 202 validates the access token and updates the resource object as indicated by 5G resource table 800. The data at timestamp T4 is modified over the data when the resource object was created at timestamp T2.

In line 5 of the message flow diagram, consumer NF 300, which is not authorized to access the resource object created by consumer NF 200, can access the resource object by obtaining an access token from NRF 100 to access the 5G NF service API. Consumer NF 300 sends an update message for the resource created by consumer NF 200. In line 6, producer NF 202 validates the access token and updates the resource object to include modified data as indicated by timestamp T6 in 5G SBI resource table 800.

In another example, consumer NF 300 can read data in a resource object created by another consumer NF. This example is illustrated in lines 7 and 8 of the message flow diagram where consumer NF 202 sends an HTTP GET request to producer NF 202, which validates the access token in the GET request and, in line 8, responds with the resource data.

Lines 9 and 10 of the message flow diagram illustrate yet another example of unauthorized access to a resource object created by another consumer NF. In line 9, consumer NF 300 sends an HTTP DELETE message to delete the resource object created by consumer NF 200 in lines 1 and 2. The DELETE message contains the access token obtained from the NRF. In line 10, producer NF 202 responds with a 202 Accepted message indicating that the DELETE operation was successful. Thus, FIG. 8 illustrates unauthorized access to an SBI resource object using the 5G direct SBI communication model.

Figure 9:
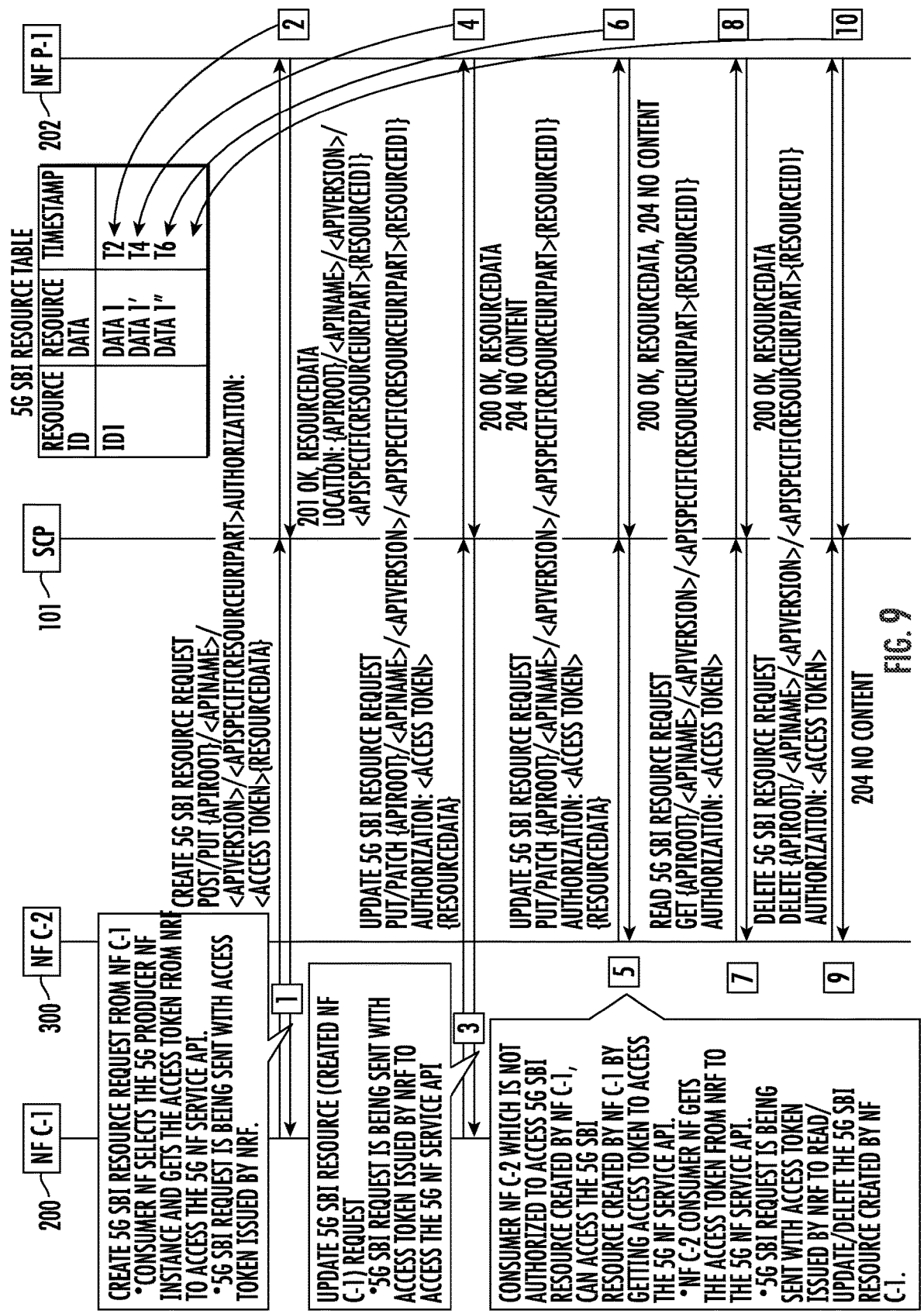
FIG. 9 is a message flow diagram illustrating the unauthorized updating of a resource object using indirect SBI communication.

FIG. 9 illustrates unauthorized access to SBI resource objects using the indirect communication model where consumer NFs send resource creation and update requests to an intermediate SCP, and the SCP communicates with the producer NF to create and update the corresponding resource objects. Referring to FIG. 9, in line 1 of the message flow diagram, consumer NF 200 sends a create resource message to SCP 101. SCP 101 forwards the create resource request to producer NF 202. In line 2, producer NF 202 creates the requested resource and sends a 201 Created message with the resource data to SCP 101. SCP 101 forwards the 201 Created message to consumer NF 200.

In line 3 of the message flow diagram, consumer NF 200 sends a resource update message to SCP 101 to update the resource object created in lines 1 and 2. SCP 101 forwards the update message to producer NF 202. In line 4, producer NF 202 validates the access token and updates the resource object to include the data in the update message, as indicated by timestamp T4 in 5G SBI resource table 800. Producer NF 202 sends a 200 OK message indicating that the resource was successfully updated or a 204 No Content message if the update was unsuccessful.

In line 5 of the message flow diagram, consumer NF 300 sends an update request to SCP 101. SCP 101 forwards the update request to producer NF 202. Because the request has a valid access token, in line 6, producer NF 202 updates the resource object to include the data in the update request, as indicated by timestamp T6 in 5G resource table 800. Producer NF 202 sends an update message to SCP 101, which forwards the message to consumer NF 200.

In line 7 of the message flow diagram, consumer NF 300 sends a message to SCP 101 to read the resource created by producer NF 202. SCP 101 forwards the request to producer NF 202. In line 8, producer NF 202 validates the access token and sends the message with the resource data to SCP 101. SCP 101 forwards the message with the resource data to consumer NF 300.

In line 9, consumer NF 300 sends a message to delete the resource created by consumer NF 200 to SCP 101. SCP 101 forwards the message to producer NF 202. Producer NF 202 validates the access token in the DELETE message, deletes the resource, and responds with a 202 Accepted message, indicating that the delete operation was successful. Thus, FIG. 9 illustrates the case using 5G SBI indirect communication were a resource object can be updated or even deleted without authorization at the resource object level.

To avoid the difficulties associated with unauthorized access to resource objects, the subject matter described herein includes an SBI resource object level access authorization service that may be maintained at an SCP for use in the indirect communication model or at a producer NF for use in the direct communication model. The SBI resource object level authorization service may operate separately and independently from OAuth 2.0 authorization implemented by a producer NF. Thus, even if an NF service consumer has a valid OAuth 2.0 access token, the SBI resource object level authorization service may prevent the NF service consumer from accessing a resource object if the access requested by the NF service consumer fails the SBI resource object level authorization service described herein.

According to one aspect of the subject matter described herein, the SBI resource object level authorization service dynamically populates a resource object owner database SBI resource object owner information. To dynamically populate the database, the SBI resource object level access authorization service may extract consumer NF information from an access token received in a 5G SBI create resource request upon receiving a success response message from a producer NF confirming creation of a resource. The consumer NF information may be extracted from the sub access token claim defined in 3GPP TS 29.510, section 6.3.5.2.4. Table 1 shown below is a copy of Table 6.3.5.2.4-1 of 3GPP TS 29.510.

TABLE 1

Access Token Claims

| Attribute name | Data type | P | Cardinality | Description |
|---|---|---|---|---|
| iss | NfInstanceId | M | 1 | This IE shall contain NF instance id of the NRF., corresponding to the standard "Issuer" claim described in IETF RFC 7519 [25], clause 4.1.1 |
| sub | NfInstanceId | M | 1 | This IE shall contain the NF instance ID of the NF service consumer, corresponding to the standard "Subject" claim described in IETF RFC 7519 [25], clause 4.1.2. |
| aud | Audience | M | 1 | This IE shall contain the NF service producer's NF instance ID(s) (if the exact NF instance(s) of the NF service producer is known) or the NF type of NF service producers for which the claim is applicable, corresponding to the standard "Audience" claim described in IETFRFC 7519 [25], clause 4.1.3. |
| scope | string | M | 1 | This IE shall contain the name of the NF services and the resource/operation-level scopes for which the access_token is authorized for use; this claim corresponds to a private claim, as described in IETF RFC 7519 [25], clause 4.3. pattern: '/\([a-zA-Z0-9_:-]+)( [a-zA-Z0-9_:-]+)*$' |
| exp | integer | M | 1 | This IE shall contain the expiration time after which the access_token is considered to be expired, corresponding to the standard "Expiration Time" claim described in IETF RFC 7519 [25], clause 4.1.4. |
| consumerPlmnId | PlmnId | C | 0..1 | This IE shall be included if the NRF supports providing PLMN ID of the NF service consumer in the access token claims, to be interpreted for subject (sub IE), as specified in clause 13.4.1.2 of 3GPP TS 33.501 [15]. If an NF service producer that receives this IE in the token included in the authorization header does not understand this IE, it shall be ignored. |
| producerPlmnId | PlmnId | C | 0..1 | This IE shall be included if the NRF supports providing PLMN ID of the NF service producer in the access token claims, to be interpreted for audience (aud IE), as specified in clause 13.4.1.2 of 3GPP TS 33.501 [15]. If an NF service producer that receives this IE in the token included in the authorization header does not understand this IE, it shall be ignored. |
| producerSnssaiList | array (Snssai) | O | 1..N | This IE may be included if the NRF supports providing list of S-NSSAIs of the NF service producer in the access token claims. If an NF service producer that receives this IE in the token included in the authorization header does not understand this IE, it shall be ignored. |
| producerNsiList | array(string) | O | 1..N | This IE may be included if the NRF supports providing list of NSIs of the NF service producer in the access token claims. If an NF service producer that receives this IE in the token included in the authorization header does not understand this IE, it shall be ignored. |
| producerNfSetId | NfSetId | O | 0..1 | This IE may be included if the NRF supports providing NF Set ID of the NF service producer in the access token claims and if the audience contains an NF type. When present, it shall indicate the NF Set ID of the NF service producer instances for which the claim |

TABLE 1-continued

Access Token Claims

| Attribute name | Data type | P | Cardinality | Description |
|---|---|---|---|---|
| | | | | is applicable. If an NF service producer that receives this IE in the token included in the authorization header does not understand this IE, it shall be ignored. |

As indicated in Table 1, the sub access token claim includes the NF instance ID of the consumer NF, which in the context of a resource object creation request message from a consumer NF to a producer NF to create a resource will contain the NF instance ID of the resource creator. The SBI resource object level access authorization service will store this NF instance ID along with the resource ID extracted from either the resource object request or response message in the resource object owner database. For subsequent requests regarding 5G resource objects, the resource object level access authorization service evaluates the consumer NFs' instance identifiers in the requests against the dynamically stored instance identifiers of resource object owners, applies operator-configured 5G SBI resource object level authorization policies, and allows or denies the 5G SBI resource access request based on the policies.

Tables 2 and 3 shown below respectively illustrate records that would appear in a 5G SBI resource object access authorization policy database and a 5G SBI resource object owner database that may be maintained by the resource object level access authorization service at the SCP or the producer NF.

TABLE 2

Example Resource Object Access Authorization Policy Database Record

| Attribute Name | Description | Valid values | Examples |
|---|---|---|---|
| 5G SBI NF Service | 3GPP defined 5G SBI NF Service | Any 3GPP defined 5G SBI NF Service | npcf-eventexposure Nnrf-nfm |
| 5G SBI Resource URI apiSpecificResource UriPart | 5G SBI apiSpecific ResourceUriPart | Any 3gpp defined 5G SBI resource URI | /subscriptions /nf-instances |
| HTTP Method | Supported HTTP methods | GET PUT PATCH DELETE | GET PUT PATCH DELETE |
| Authorized consumer NF(s) scope | NFs which are authorized to access the resources in the same scope. | NF Instance NF-Set NF-Type NetworkSlice PLMN All | NF Instance NF-Set NF-Type NetworkSlice PLMN All |

TABLE 3

Example Resource Object Owner Database Record

| Attribute Name | Description | Valid values | Examples |
|---|---|---|---|
| Resource URI | Resource URI of defined 3GPP 5G SBI resources | Any 3GPP defined 5G SBI NF Service {apiRoot}/<apiName>/< apiVersion>/<apiSpecific ResourceUriPart> | {apiRoot}/npcf-eventexposure/v1// subscriptions/ sub123987 |

TABLE 3-continued

Example Resource Object Owner Database Record

| Attribute Name | Description | Valid values | Examples |
|---|---|---|---|
| Resource owner | NF instance Id of NF that created the resource | NF Instance ID | 1faf1bbc-6e4a-4454-a507-a14ef8e1bb65 |

In Table 2, the example 5G SBI resource object access authorization policy database record includes the following attributes for a given resource object access authorization policy: 5G SBI NF service, 5G SBI resource URI, HTTP method(s), Authorized consumer NF scope. The 5G SBI NF service attribute stores the name of the 3GPP defined SBI NF service and can store the name of any 3GPP-defined NF service. Example values of the 5G SBI NF service attribute in Table 2 include Npcf-eventexposure and Nnrf-udm. The 5G resource URI attribute stores the 3GPP-defined 5G SBI resource URI for a resource object. Example values of this attribute in Table 2 include /subscriptions and /nf-instances, which are intended to represent the URIs for specific 5G resource objects. The HTTP method(s) attribute stores HTTP methods for the particular policy rule. In Table 2, the defined HTTP methods for the example policy rule are GET, PUT, PATCH, and DELETE. The authorized consumer NF scope attribute defines the scope of consumer NFs to which the policy rule applies. The values for this attribute in Table 2 include NF instance, NF-Set, NF-Type, NetworkSlice, PLMN, and All.

The data in Table 2 may be provisioned by the network operator at NF configuration time according to the operator specific policies. The data in Table 3 may be populated dynamically at runtime when a resource object is created. In Table 3, the example attributes for the resource object ownership database record include resource URI and resource owner. The resource URI attribute stores the URI for a newly created resource object. The resource owner attribute stores the NF instance ID of the consumer NF that requested creation of the resource. If the resource owner database is maintained at an SCP, the fields in Table 3 may be populated when the resource request creation response from the producer NF is received by the SCP using resource object owner information extracted from the corresponding resource object creation request. If the resource owner database is maintained at a producer NF, the data in Table 3 may be populated at the time of resource object creation by the producer NF using resource object owner information extracted from the resource object creation request.

The data in the resource owner database will be used in combination with the data in the resource object access authorization policy database to determine whether to allow consumer NF access to a particular resource object. For example, if the defined scope for a particular resource object in the resource object access authorization policy database is NF instance and a message arrives to update the resource object, the resource object level access authorization service may determine whether a policy is configured for the resource object. Determining whether a policy is configured for the resource object may include performing a lookup in the resource object access authorization policy database using the resource URI identified in the update request message. If the resource URI in the resource object update request message matches the resource URI for one of policy rules, the resource object level access authorization service may determine whether allowing the access would violate the policy using the data stored in the resource object owner database. For example, if the resource object access policy indicates that access to the resource object should be granted only if the NF instance ID of the consumer NF in the access request message matches the NF instance ID of the resource object owner, then the access request should be denied if the NF instance IDs do not match.

Figure 10:
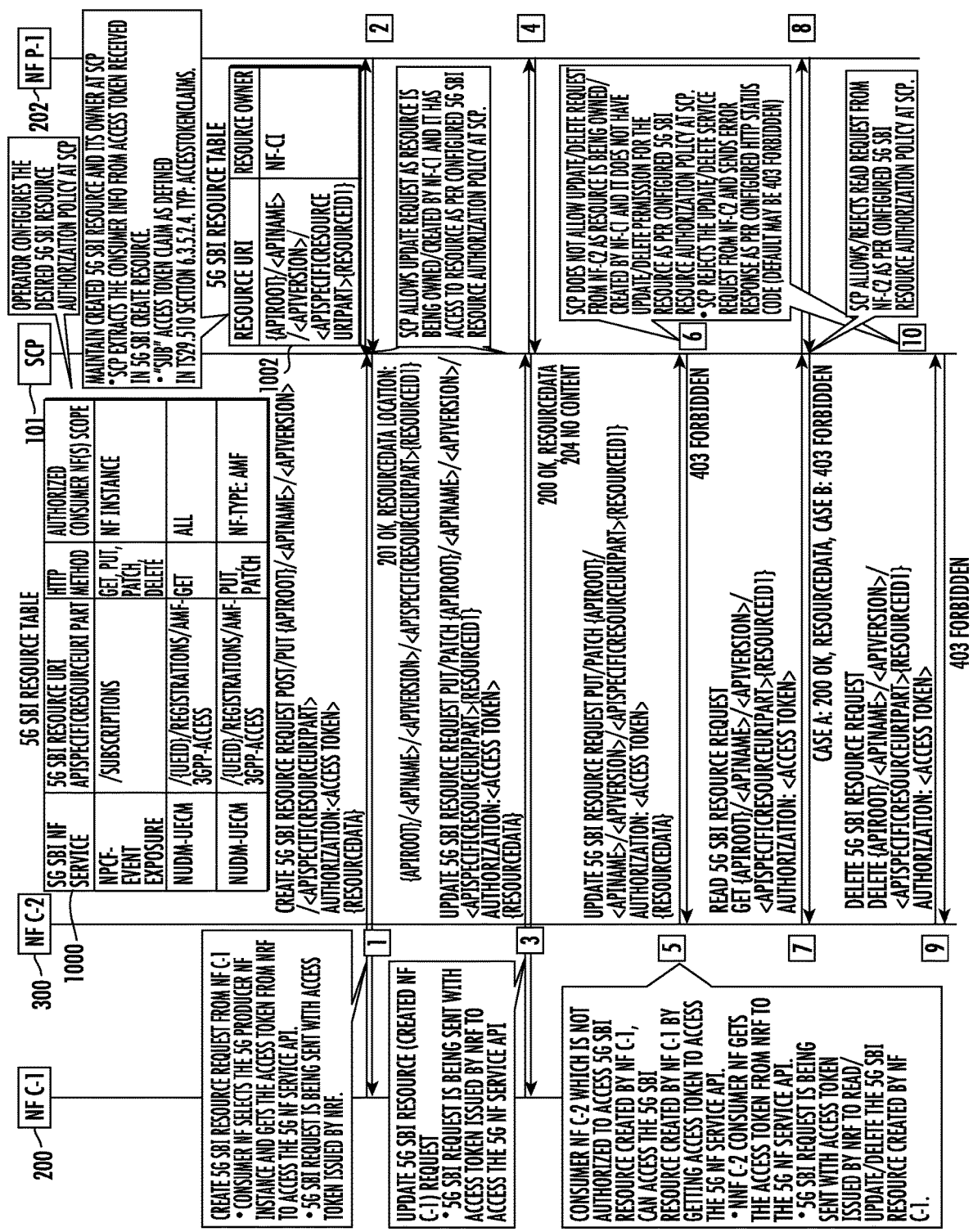
FIG. 10 is a message flow diagram illustrating exemplary messages exchanged for preventing unauthorized access to a resource object using SBI indirect communication.

FIG. 10 is a diagram illustrating the use of the resource object level authorization access authorization service described above to manage access to SBI resource objects at the resource object level. FIG. 10 illustrates examples of a resource object access authorization policy database 1000 containing resource object access authorization policy rules configured by a network operator and a resource object owner database 1002 containing dynamically populated resource object owner information. In FIG. 10, databases 1000 and 1002 are located at SCP 101. However, as described above, these databases could alternatively be configured at producer NFs that provide the services corresponding to the protected resource objects.

Referring to the message flow in FIG. 10, in line 1, consumer NF 200 sends a message to SCP 101 to create a resource object with producer NF 202. SCP 101 forwards the resource object creation request to producer NF 202. SCP 101 may extract the NF instance ID from the sub claim of the access token of the resource object creation request. In line 2, producer NF 202 creates the resource object and responds with a 201 Created message. Producer NF 202 forwards the 201 Created message to SCP 101, which stores, in the resource object owner database, the URI for the resource extracted from the response message along with the NF instance ID of the consumer NF extracted from the resource object creation request message. Alternatively, rather than extracting the URI of the resource from the response message, SCP 101 could extract the URI of the resource from the resource object creation request message. SCP 101 at this point then has a complete record for the resource identifying the resource object and the owner. SCP 101 forwards the 201 Created message to consumer NF 200.

In line 3, consumer NF 200 sends a message to update the resource object. SCP 101 receives the message, determines that a policy applies to the resource object, and determines that the update request should be allowed because the NF instance ID of the consumer NF in the resource object update request matches the NF instance ID of the resource object owner identified in the SBI resource table. Accordingly, in line 4, SCP 101 forwards the resource object update request to producer NF 202, which updates the resource object. In line 4, producer NF 202 forwards the forwards a 200 OK message to SCP 101, which forwards the 200 OK message to consumer NF 200.

In line 5, consumer NF 300 generates and sends a message to SCP 101 to update the resource created by consumer NF 200. SCP 101 determines that a policy applies to the resource update request, compares the NF instance ID of consumer NF 300 obtained from the update request to the NF instance ID of the resource object owner, and determines that the request violates the policy. Accordingly, in line 6, SCP 101 rejects the update request and sends an error response, such as a 403 Forbidden message to consumer NF 300.

In line 7, consumer NF 300 sends a read request to read the resource object created at the request of consumer NF 200. SCP 101 receives the read request and either allows or rejects the request based on authorization policies configured for the resource. In the illustrated example, the read request is allowed. However, if the read operation is not allowed, the read request would be rejected in a similar manner to the update request.

In line 9 of the message flow diagram, consumer NF 300 sends a delete request to SCP 101 for the resource object created at the request of consumer NF 200. In this example, SCP 101 evaluates the delete request against the configured policy, determines that the delete request is not allowed and rejects the delete request message. Accordingly, using the steps illustrated in FIG. 10, unauthorized access to a resource object is prevented based on resource access level authorization policies.

Figure 11:
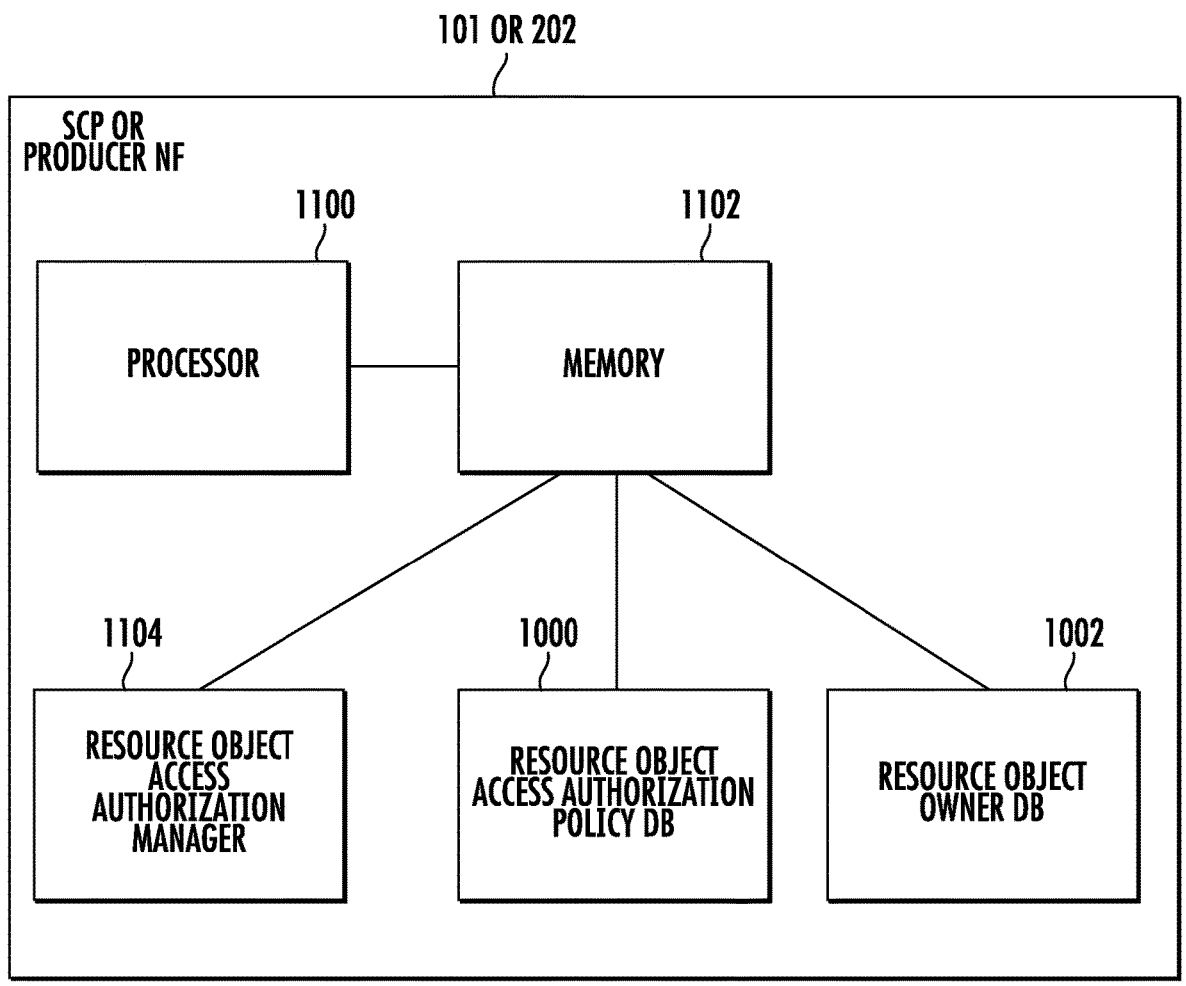
FIG. 11 is a block diagram illustrating an exemplary architecture of a network function for providing SBI resource level authorization.

FIG. 11 is a block diagram illustrating an example architecture of an SCP or producer NF 101 or 202 that implements the resource object level authorization described herein. Referring to FIG. 11, SCP 101 or producer NF 202 includes at least one processor 1100 and a memory 1102. Resource object access authorization policy database 1000 may be stored in memory 1102 and may include the operator-configured resource object level policy rules described above. Resource object owner database 1002 may also be stored in memory 1102 and may be populated at runtime by SCP 101 or producer NF 202. SCP 101 or consumer NF 202 may further include a resource object access authorization manager 1104 that dynamically populates resource object owner database 1002 and uses the data in databases 1000 and 1002 to perform the steps described herein for resource object level access authorization. Resource object access authorization manager 1104 may be implemented using computer executable instructions stored in memory 1102 and executed by processor 1100.

Figure 12:
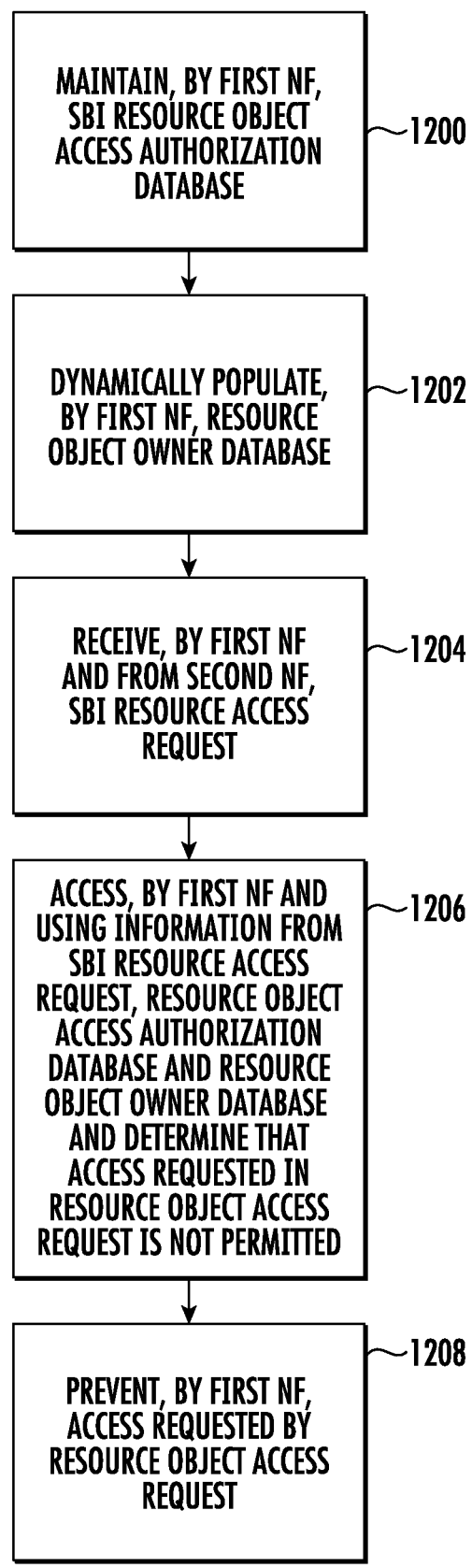
FIG. 12 is a flow chart illustrating an exemplary process for SBI resource object level authorization.

FIG. 12 is a flow chart illustrating an exemplary process for providing resource object level authorization at a network function. Referring to FIG. 12, in step 1200, the process includes maintaining, by a first network function (NF), a service based interface (SBI) resource object access authorization policy database containing policies for controlling access to SBI resource objects. For example, an SCP or a producer NF may be configured with a database containing resource object access authorization policies set by a network operator. Examples of such policies are described above with regard to Table 2 and resource object access authorization policy database 1000. The policies may have identifiers of resource objects to which each policy pertains as well as identifiers scopes of NFs to which the policies apply.

In step 1202, the process includes dynamically populating, by the first NF, a resource object owner database containing records for resource objects and corresponding resource object owners. For example, resource object access authorization manager 1104 may extract NF instance identifiers from sub claims of access tokens that are included in resource object creation request messages from consumer NFs and create records in the resource object owner database identifying the consumer NFs and corresponding resource objects in response to receiving success responses from producer NFs confirming creation of the resource objects.

In step 1204, the process includes receiving, by the first NF and from a second NF, a first SBI resource access request for accessing a resource object. For example, an SCP or producer NF may receive, from a consumer NF, an HTTP GET, PUT, PATCH, or DELETE message that attempts to read, update, or delete an existing resource object.

In step 1206, the process includes accessing, by the first NF and using information from the SBI resource object access request, the resource object access authorization policy database and the resource object owner database and determining that the access requested by the resource object access request is not permitted. In one example, resource object access authorization manager 1104 may determine that the resource object access control policy indicates that only the resource owner can access the resource, and, from the resource object owner database, that the requesting consumer NF is not the owner. In another example, resource object access authorization manager 1104 may determine that the type of access requested by the first SBI resource object access request is not permitted. For example, a resource object authorization policy may provide that consumer NFs of the same type as the resource object owner can read the resource object using the HTTP GET method but that the consumer NFs who are of the same type as the resource object owner cannot modify or delete the resource object using HTTP PUT, PATCH, or DELETE methods. The resource object owner may be allowed to modify the resource object using the HTTP PUT, PATCH, or DELETE methods.

In step 1208, the process includes, in response to determining that the access requested by the resource object access request is not permitted, preventing the access requested by the resource object access request. For example, resource object access authorization manager 1104 may prevent the access by, in the case of an SCP, not forwarding the access request to the producer NF. In the case of a producer NF implementing the access control, preventing the requested access may include ignoring the request. In either an SCP or producer NF implementation, resource object access authorization manager 1104 may generate and send an error message to the requestor, store the request, and notify the network operator of the rejected access attempt.

The disclosure of each of the following references is hereby incorporated herein by reference in its entirety.

REFERENCES 1. 3GPP TS 33.501 V17.0.0 (December 2020) 3rd Generation Partnership Project; Technical Specification Group Services and System Aspects; Security Architectures and Procedures for 5G System (Release 17).
2. 3GPP TS 29.510 V17.0.0 (December 2020), 3rd Generation Partnership Project; Technical Specification Group Core Network and Terminals; 5G System; Network Function Repository Services; Stage 3 (Release 17).
3. 3GPP TS 29.500 V17.1.0 (December 2020), 3rd Generation Partnership Project; Technical Specification Group Core Network and Terminals; 5G System; Technical Realization of Service Based Architecture; Stage 3 (Release 17).
4. 3GPP TS 29.501 V17.0.0 (December 2020) 3rd Generation Partnership Project; Technical Specification Group Core Network and Terminals; 5G System; Principles and Guidelines for Services Definition; Stage 3 (Release 17).
5. Hardt, D., The OAuth2.0 Authorization Framework, IETF RFC 6749 (October 2012).
6. Jones et al., JSON Web Token, IETF RFC 7519 (May 2015).
7. Jones et al., JSON Web Signature, IETF RFC 7515 (May 2015).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for resource object level authorization at a network function implemented using hardware, the method comprising:
   maintaining, by a first network function (NF) implemented using hardware, a service based interface (SBI) resource object access authorization policy database containing policies for controlling access to SBI resource objects;
   dynamically populating, by the first NF, a resource object owner database containing records for resource objects and corresponding resource object owners;
   receiving, by the first NF and from a second NF implemented using hardware, a first SBI resource object access request for accessing a resource object;
   accessing, by the first NF and using information from the first SBI resource object access request, the resource object access authorization policy database and the resource object owner database and determining that an access to the resource object requested by the first resource object access request is not permitted;
   in response to determining that the access to the resource object requested by the first resource object access request is not permitted, preventing the access to the resource object requested by the first resource object access request; and
   receiving, at the first NF and from a third NF implemented using hardware, a second SBI resource object access request for accessing the resource object, accessing the resource object access authorization policy database and the resource object owner database using information from the second SBI resource object access request and granting the third NF access to the resource object.

2. The method of claim 1 wherein the first NF comprises a producer NF.

3. The method of claim 1 wherein the first NF comprises a service communication proxy (SCP).

4. The method of claim 1 wherein maintaining the SBI resource object access authorization policy database includes maintaining policies having attributes that identify SBI resource objects, hypertext transfer protocol (HTTP) methods for accessing the SBI resource objects, and consumer NF authorization scopes for the SBI resource objects.

5. A method for resource object level authorization at a network function implemented using hardware, the method comprising:
   maintaining, by a first network function (NF) implemented using hardware, a service based interface (SBI) resource object access authorization policy database containing policies for controlling access to SBI resource objects;
   dynamically populating, by the first NF, a resource object owner database containing records for resource objects and corresponding resource object owners, wherein dynamically populating the resource object owner database includes receiving, from consumer NFs, SBI resource object creation requests, extracting, from the 5G SBI resource object create requests, NF instance identifiers of the consumer NFs that originated the SBI resource object creation requests, receiving, from producer NFs, responses to the SBI resource object creation requests confirming successful creation of the resource objects, and, in response to receiving the responses to the SBI resource object creation requests, storing the NF instance identifiers of the consumer NFs and corresponding resource object identifiers in the resource object owner database;

receiving, by the first NF and from a second NF implemented using hardware, a first SBI resource object access request for accessing a resource object;

accessing, by the first NF and using information from the first SBI resource object access request, the resource object access authorization policy database and the resource object owner database and determining that an access to the resource object requested by the first resource object access request is not permitted; and in response to determining that the access to the resource object requested by the first resource object access request is not permitted, preventing the access to the resource object requested by the first resource object access request.

6. The method of claim 5 wherein extracting the NF instance identifiers from the 5G SBI resource object creation requests includes extracting the NF instance identifiers of the consumer NFs from sub claim attributes of access tokens in the 5G SBI resource object creation requests.

7. The method of claim 1 wherein accessing the resource object access authorization policy database includes extracting a resource object identifier from the first SBI resource object access request, performing a lookup in the resource object access authorization policy database using the resource object identifier, and locating a record in the resource object access authorization policy database having a resource object identifier that matches the resource object identifier extracted from the first SBI resource object access request.

8. A method for resource object level authorization at a network function implemented using hardware, the method comprising:

maintaining, by a first network function (NF) implemented using hardware, a service based interface (SBI) resource object access authorization policy database containing policies for controlling access to SBI resource objects;

dynamically populating, by the first NF, a resource object owner database containing records for resource objects and corresponding resource object owners;

receiving, by the first NF and from a second NF implemented using hardware, a first SBI resource object access request for accessing a resource object;

accessing, by the first NF and using information from the first SBI resource object access request, the resource object access authorization policy database and the resource object owner database and determining that an access to the resource object requested by the first resource object access request is not permitted, wherein determining that the access requested by the first SBI resource object access request is not permitted includes determining that the access is only permitted to an owner of the resource object and determining that the second NF is not the owner of the resource object; and in response to determining that the access to the resource object requested by the first resource object access request is not permitted, preventing the access to the resource object requested by the first resource object access request.

9. The method of claim 1 wherein determining that the access requested by the first SBI resource object access request is not permitted includes determining that a type of access requested by the resource object access request is not permitted.

10. A system for resource object level authorization at a network function implemented using hardware, the system comprising:

a first network function (NF) implemented using hardware and including at least one processor and a memory;

a service based interface (SBI) resource object access authorization policy database located in the memory for storing policies for controlling access to SBI resource objects;

a resource object owner database for storing records containing resource object identifiers and corresponding resource object owner identifiers;

a resource object access authorization manager for dynamically populating the records in the resource object owner database, receiving, from a second NF implemented using hardware, a first SBI resource object access request for accessing a resource object, accessing, using information from the first SBI resource request, the resource object access authorization policy database and the resource object owner database, determining that an access to the resource object requested by the first SBI resource object access request is not permitted, and, in response to determining that the access to the resource object requested by the first SBI resource object access request is not permitted, preventing the access to the resource object requested by the first SBI resource object access request, wherein, in determining that the access requested by the first SBI resource object access request is not permitted, the resource object access authorization manager is configured to determine that the access is only permitted to an owner of the resource object and determining that the second NF is not the owner of the resource object.

11. The system of claim 10 wherein the first NF comprises a producer NF.

12. The system of claim 10 wherein the first NF comprises a service communication proxy (SCP).

13. The system of claim 10 wherein the SBI resource object access authorization policy database includes policies having attributes that identify SBI resource objects, hypertext transfer protocol (HTTP) methods for accessing the SBI resource objects, and consumer NF authorization scopes for the SBI resource objects.

14. A system for resource object level authorization at a network function implemented using hardware, the system comprising:

a first network function (NF) implemented using hardware and including at least one processor and a memory;

a service based interface (SBI) resource object access authorization policy database located in the memory for storing policies for controlling access to SBI resource objects;

a resource object owner database for storing records containing resource object identifiers and corresponding resource object owner identifiers;

a resource object access authorization manager for dynamically populating the records in the resource object owner database, receiving, from a second NF implemented using hardware, a first SBI resource object access request for accessing a resource object, accessing, using information from the first SBI resource request, the resource object access authorization policy database and the resource object owner database, determining that an access to the resource object requested by the first SBI resource object access request is not permitted, and, in response to determining that the access to the resource object requested by the first SBI resource object access request is not permitted, preventing the access to the resource object requested by the first SBI resource object access request, wherein, in dynamically populating the resource object owner database, the resource object access authorization manager is configured to receive, from consumer NFs, SBI resource object creation requests, extract, from the SBI resource object creation requests, NF instance identifiers of the consumer NFs that originated the resource object creation requests, receive, from producer NFs, responses to the SBI resource object creation requests confirming successful creation of the resource objects, and, in response to receiving the responses, store the NF instance identifiers of the consumer NFs and corresponding resource object identifiers in the resource object owner database.

15. The system of claim 14 wherein the resource object access authorization manager is configured to extract the NF instance identifiers of the consumer NFs from sub claim attributes of access tokens in the SBI resource object creation requests.

16. The system of claim 10 wherein, in accessing the resource object access authorization policy database, the resource object access authorization manager is configured to extract a resource object identifier from the first SBI resource object access request, perform a lookup in the resource object access authorization policy database using the resource object identifier, and locate a record in the resource object access authorization policy database having a resource object identifier that matches the resource object identifier extracted from the first SBI resource object access request.

17. A non-transitory computer readable medium having stored thereon executable instructions that when executed by a processor of a computer control the computer to perform steps comprising:

maintaining, by a first network function (NF) implemented using hardware, a service based interface (SBI) resource object access authorization policy database containing policies for controlling access to SBI resource objects;

dynamically populating, by the first NF, a resource object owner database containing records for resource objects and corresponding resource object owners;

receiving, by the first NF and from a second NF implemented using hardware, a first SBI resource object access request for accessing a resource object;

accessing, by the first NF and using information from the first SBI resource object access request, the resource object access authorization policy database and the resource object owner database and determining that an access to the resource object requested by the first SBI resource object access request is not permitted;

in response to determining that the access to the resource object requested by the first SBI resource object access request is not permitted, preventing the access to the resource object requested by the first SBI resource object access request; and receiving, at the first NF and from a third NF implemented using hardware, a second SBI resource object access request for accessing the resource object, accessing the resource object access authorization policy database and the resource object owner database using information from the second SBI resource object access request and granting the third NF access to the resource object.

* * * * *